M. S. GOLDMAN.
ADVERTISING AND EDUCATIONAL TOY.
APPLICATION FILED SEPT. 29, 1917.

1,273,605.

Patented July 23, 1918.
2 SHEETS—SHEET 1.

WITNESS

INVENTOR.
M. S. Goldman
by F. N. Barber
Attorney

M. S. GOLDMAN.
ADVERTISING AND EDUCATIONAL TOY.
APPLICATION FILED SEPT. 29, 1917.
1,273,605.
Patented July 23, 1918.
2 SHEETS—SHEET 2.
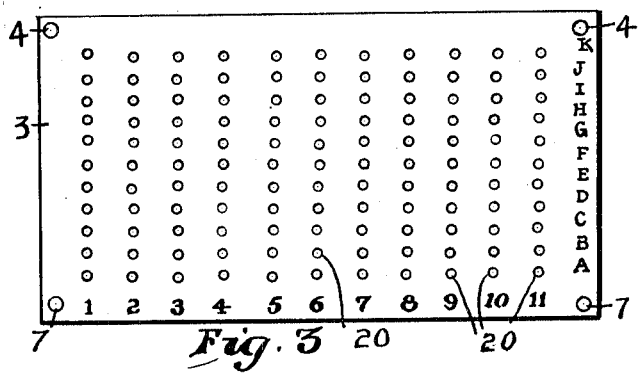
Fig. 3
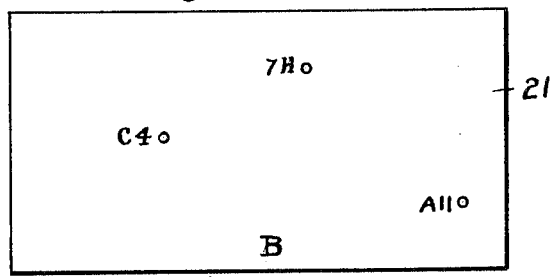
Fig. 4
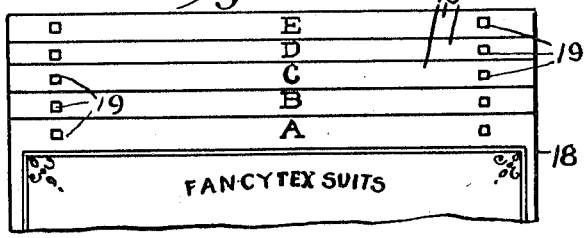
Fig. 5
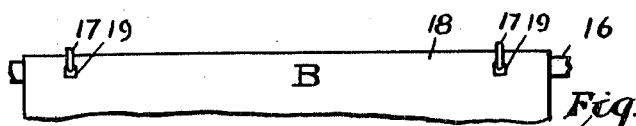
Fig. 6
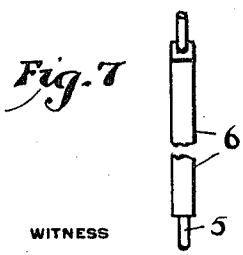
Fig. 7 Fig. 8
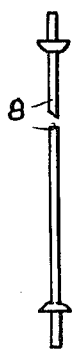
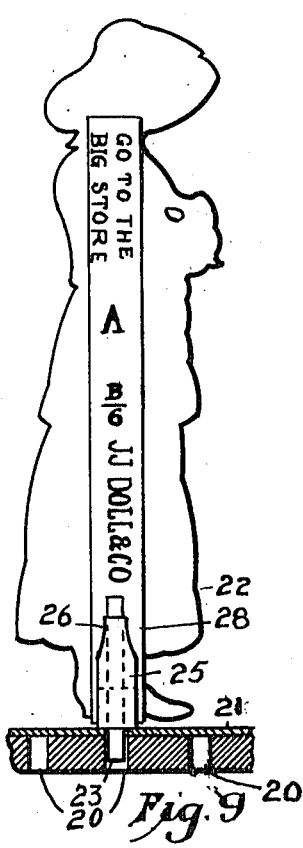
Fig. 9
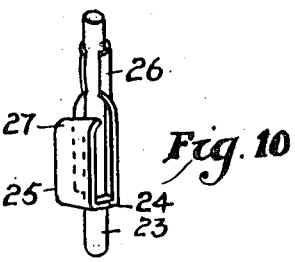
Fig. 10 Fig. 11
WITNESS
R. F. Dilworth
INVENTOR.
M. S. Goldman
by F. N. Barber
attorney

UNITED STATES PATENT OFFICE.

MATTHEW S. GOLDMAN, OF PITTSBURGH, PENNSYLVANIA.

ADVERTISING AND EDUCATIONAL TOY.

1,273,605.   Specification of Letters Patent.   Patented July 23, 1918.

Application filed September 29, 1917. Serial No. 194,070.

*To all whom it may concern:*

Be it known that I, MATTHEW S. GOLDMAN, a citizen of the United States, residing at Pittsburgh, in the county of Allegheny and State of Pennsylvania, have invented new and useful Improvements in Advertising and Educational Toys, of which the following is a specification.

My invention relates to toys and more particularly to that class of toys representing store fronts or show windows, which with slight changes may be made to represent a theater. One object is to provide representations of department store displays of various kinds of mechandise, the toy being so constructed that groups of articles corresponding to special lines of merchandise may be separately assembled in definite relative positions for each group, but in different relative positions, for the different groups. The groups bear suitable distinguishing legends by which the individuals of the separate groups may be collected together and be arranged in a suitable order and with a suitable background and base or not. The toy will teach the principles of store window display as it contemplates the use of miniature articles of merchandise or representations thereof in their relative sizes and their natural colors and artistic arrangement. It will teach the harmonious arrangement of articles varying in color, size, shape, and the like. These articles will bear the names of the articles and the names of the manufacturers or distributers together with other advertising matter. As a theater, the characters representing the real persons taking parts in dramas, for example, may be changed from place to place on the base or mats to correspond to the positions assumed in the progress of the play, whereby the interest of the children will be secured and maintained and the entire play be remembered. At the same time, harmony of colors and arrangement will be impressed on the minds of the children. The toy may be employed as a store, where selling and buying may be made realistic, the advertising feature being also present, as the children and their parents will have the names and products of the merchandise thoroughly impressed upon them by the continued familiarity with them.

Figure 1:
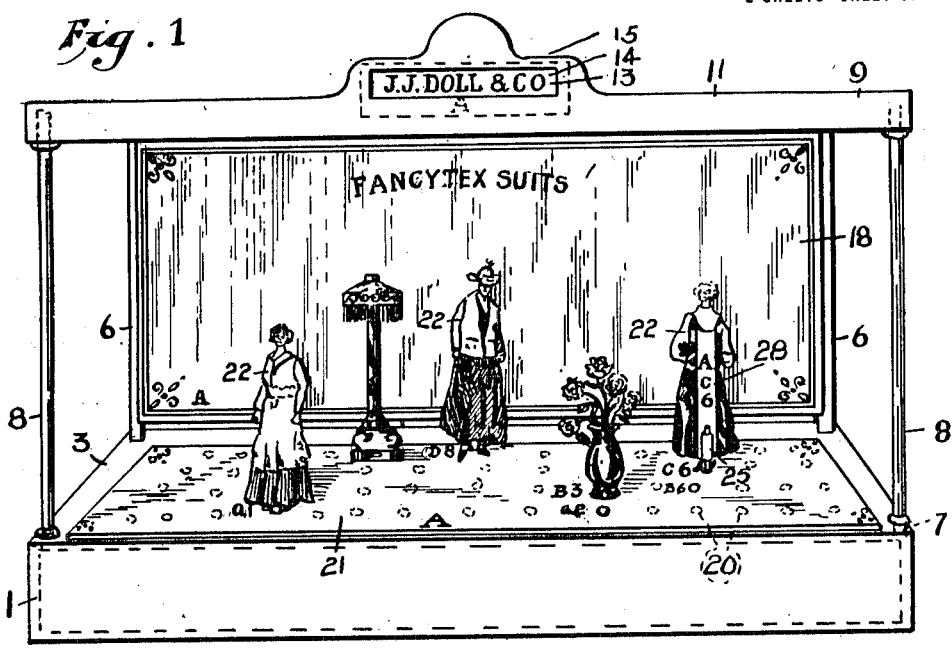
Figure 2:
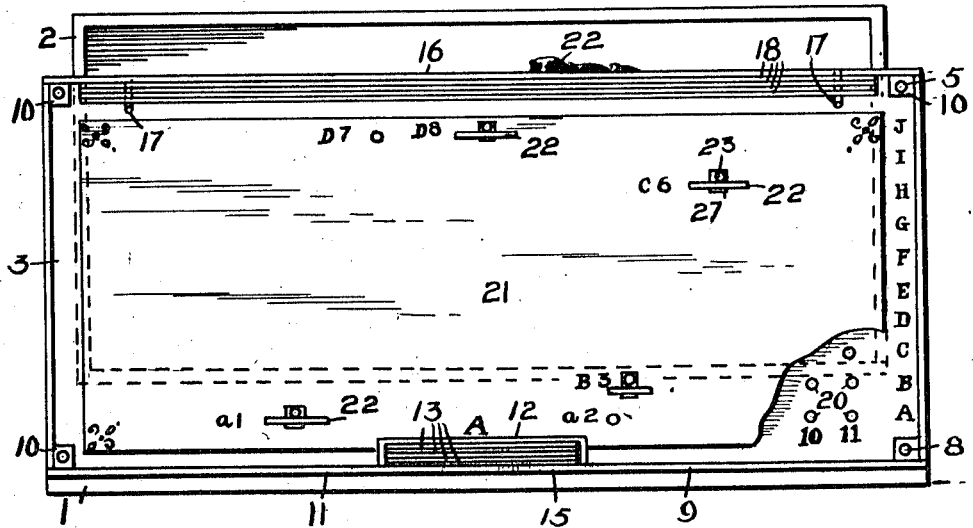

Referring to the accompanying drawings, Figure 1 is a front view of my invention illustrating one of its many uses; Fig. 2, a top plan view of the same with a portion of the mat broken away; Fig. 3, a plan view of the floor of the toy; Fig. 4, a plan of one of the various mats which may be used on the said floor; Fig. 5, a front view of the upper portions of five backgrounds; Fig. 6, a front elevation of a portion of a background and its support; Fig. 7, an elevation of one of the rear posts, a part being broken away; Fig. 8, an elevation of one of the front posts with a portion broken away; Fig. 9, an enlarged rear elevation of one of the figures shown on Fig. 1, with a vertical section of a part of the floor and mat beneath the figure; Fig. 10, a perspective view of a clasp and supporting device for the articles displayed; and Fig. 11, a front elevation of one of the advertising legends.

On the drawings, 1 designates a rectangular box-like support, provided preferably with the drawer 2 insertible at the rear side of the support, the drawer being partly withdrawn and the parts beneath the floor 3 of the support being shown in dotted lines. The rear corners of the floor 3 have the mortises 4 to receive the tenons 5 at the lower ends of the posts 6 and the front corners have the mortises 7 for the lower ends of the posts 8. The rectangular top frame 9 carries in its angles the blocks 10 having mortises to receive the upper ends of the posts 6 and 8.

The rear face of the front member 11 of the frame 9 carries the pocket 12 which contains preferably legends 13 indicating the names of the advertisers or the subjects of the various displays with which the toy is equipped. The legends are placed on edge one behind another, the front legend being visible through the opening 14 in the upward extension 15 of the frame member 11.

The rear member 16 of the frame 9 supports the forwardly projecting hooks 17 on which a number of backgrounds 18 corresponding to the legends 13 are suspended, the backgrounds having the openings 19 for the hooks.

The floor 3 is provided with longitudinal rows of vertical openings arranged parallel with the front edge of the base 1 and designated by letters as A, B, C, etc. These openings are also arranged in transverse rows arranged parallel with the end edges of the base and designated by numerals as 1, 2, 3, etc. By this arrangement and designations, any opening may be named by giving the combination of the letter and numeral corresponding to the longitudinal and transverse rows occupied thereby. For example, opening $B^6$ would be the one at the intersection of the row B with the row 6.

21 designates a mat or chart to be selected from a number of them, to correspond with the color, or other artistic scheme in harmony with a selected background and the display figures or articles to be used. This mat has therein certain openings corresponding in shape and location with certain of the openings 20 in the floor. The openings in the mat will be arranged at the particular places where the selected objects of the display are to be positioned to secure harmony of color, pleasing arrangement, imitative assemblage, or other desired artistic, educational, advertising, or entertaining effect. The openings in the mat are preferably marked with the letter and numeral or other designation of the openings 20 with which they correspond. Thus, a mat opening $B^6$ would occupy a place over the opening $B^6$ in the floor 3.

I have selected for display an exhibit of "Fancytex suits" for women and have accordingly provided miniature figures having the advertised clothes painted thereon or applied thereon by using the actual material advertised. The coloring, arrangement, style, etc., of the figures will be selected to give the most pleasing effect with the selected background and mat. In order that the user of the toy will make the proper collection of legends, background, mat, and display figures, I provide each set or group with a common designating mark. For example, I have used the letter A (Figs. 1, 5, 9, and 11) to designate all the members of one group. I have shown in Fig. 5 other letters designating background members of other groups.

The figures 22 are provided with the pins 23 which extend into the openings in the mat and floor, as shown in Fig. 9. The pin 23 extends through the horizontal portion 24 of the clasp 25. One end portion is bent up along one side of the pin and bent partially around the pin as shown at 26 so as to maintain the assemblage of the clasp and pin. The other end portion is bent up on the opposite side of the pin and has its upper end bent at 27 toward the pin, the lower portion of the figure or some attachment, as 28, thereon being clamped between the pin 23 and the portion 27.

It will be understood that the articles assembled for display may be bottles and cans of pickles, beans, catsup, olive oil, etc., or furniture, carpets, drugs, safety razors, etc., to be arranged with the proper backgrounds and mats and in the precise manner employed by the actual displays in store windows or the like. The toy may be used without the mats, but its beauty would in many cases be sacrificed and the articles could not be so readily arranged, and with small children and careless persons they would not be arranged properly.

The posts 6 and 8 may be taken out of the base 1 and the frame 9, and the mats, display figures, etc., may be placed in the drawer 2, and the backgrounds, posts, and frame 9 may be packed tightly with the base for shipment.

I claim:—

1. In an advertising and educational toy, a miniature store front, containing a floor provided with a plurality of openings, a background, a mat on the floor provided with openings arranged to register with certain of the openings in the floor, and a group of objects provided with supporting means in the registering openings in the floor and mat.

2. In a toy, a floor, means for supporting a background, a plurality of backgrounds, a plurality of mats for the floor, a plurality of sets of objects, the backgrounds, mats and sets of objects comprising groups each with a background, a mat and a set of objects having harmonious visual characteristics, means for identifying each group, and means for identifying the disposition of the set of correlative objects on the mat of each group.

3. In a toy, a floor, means for supporting a background, a plurality of backgrounds, a plurality of mats for the floor, a plurality of sets of objects, the backgrounds, mats and sets of objects comprising groups each with a background, a mat and a set of objects having harmonious visual characteristics, means for identifying each group, means for identifying the disposition of the set of correlative objects on the mat of each group, a number of openings in the floor, a small number of openings in each mat arranged to register with certain openings in the floor, and means in the registering openings for supporting the objects.

4. In a toy, a floor provided with a number of openings, a background support, a number of backgrounds of different visual characteristics, a number of sets of objects, the sets harmonizing respectively with the said characteristics of the backgrounds, means for identifying each background with its correlative set of objects, means in certain of the floor openings for supporting the objects, and means indicating the positioning of the objects in the openings to secure their harmonious arrangement with the background and one another.

5. In a toy, a floor with a number of openings, a mat with fewer openings arranged to register with some of the floor openings, a group of objects, means in the registering openings for supporting the objects, and means for indicating the relative arrangement of the objects.

Signed at Pittsburgh, Pa., this 28th day of September, A. D. 1917.

MATTHEW S. GOLDMAN.